(12) United States Patent
Wang et al.

(10) Patent No.: US 11,616,539 B2
(45) Date of Patent: Mar. 28, 2023

(54) BEAMFORMING METHOD AND APPARATUS FOR MASSIVE MIMO SYSTEM

(71) Applicant: Alcatel Lucent, Nozay (FR)

(72) Inventors: Lei Wang, Shanghai (CN); Zhenhao Cai, Shanghai (CN); Kun Zhao, Shanghai (CN); Xunyong Zhang, Shanghai (CN); Yang Xu, Shanghai (CN)

(73) Assignee: Alcatel Lucent, Nozay (FR)

( * ) Notice: Subject to any disclaimer, the term of this patent is extended or adjusted under 35 U.S.C. 154(b) by 294 days.

(21) Appl. No.: 16/471,457

(22) PCT Filed: Dec. 18, 2017

(86) PCT No.: PCT/IB2017/001714
§ 371 (c)(1),
(2) Date: Jun. 19, 2019

(87) PCT Pub. No.: WO2018/115974
PCT Pub. Date: Jun. 28, 2018

(65) Prior Publication Data
US 2021/0135715 A1 May 6, 2021

(30) Foreign Application Priority Data
Dec. 21, 2016 (CN) .......................... 201611194059.4

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0469* (2013.01); *H04B 7/0617* (2013.01); *H04B 7/0634* (2013.01); *H04B 7/10* (2013.01)

(58) Field of Classification Search
None
See application file for complete search history.

(56) References Cited

U.S. PATENT DOCUMENTS

2005/0260954 A1* 11/2005 Hamalainen ......... H04B 7/0634
455/101
2012/0243581 A1 9/2012 Lu et al.
(Continued)

FOREIGN PATENT DOCUMENTS

CN 101021561 A * 8/2007
CN 104184690 A 4/2017
(Continued)

OTHER PUBLICATIONS

International Search Report for PCT/IB2017/001714 dated Jun. 7, 2018.
(Continued)

*Primary Examiner* — Noel R Beharry
*Assistant Examiner* — Rodrick Mak
(74) *Attorney, Agent, or Firm* — Lippes Mathias LLP

(57) ABSTRACT

An object of the present disclosure is to provide a beamforming method for a massive MIMO system. Specifically, S routes of data streams to be transmitted via the antenna array are subjected to horizontal direction baseband beamforming processing, to obtain T routes of data streams; the T-routes of data streams are subjected to vertical direction digital beamforming processing to map the T routes of data streams onto a corresponding channel according to a predetermined rule; a data stream on each channel is subjected to analog beamforming processing to map the data stream on each channel onto a corresponding array element of the antenna array for transmission. Compared with the prior art, the present disclosure implements the following advantages: by combining the advantages of RF beamforming with the BB beamforming with limited antennas at the FH, a good
(Continued)

flexibility regarding BB algorithm selection and RF beam design is provided, which balances the complexity and performance between BB and RF and implements a massive MIMO in sub-6 GHz.

9 Claims, 3 Drawing Sheets

(51) Int. Cl.
    *H04B 7/06*     (2006.01)
    *H04B 7/10*     (2017.01)

(56) References Cited

U.S. PATENT DOCUMENTS

| | | |
|---|---|---|
| 2013/0039445 A1 | 2/2013 | Hwang |
| 2013/0202054 A1 | 8/2013 | Khan et al. |
| 2014/0050280 A1 | 2/2014 | Stirling-Gallacher et al. |
| 2015/0188682 A1 | 7/2015 | Noh et al. |
| 2017/0019159 A1* | 1/2017 | Vook .............. H04B 7/0478 |
| 2017/0214501 A1* | 7/2017 | Byun ............... H04L 5/0032 |
| 2018/0026749 A1* | 1/2018 | Lomayev ........... H04L 5/0023 375/267 |
| 2021/0151891 A1* | 5/2021 | Bongard ............ H01Q 21/245 |

FOREIGN PATENT DOCUMENTS

| | | | |
|---|---|---|---|
| CN | 106160809 A | 3/2020 | |
| WO | WO 2013/181850 A1 | 12/2013 | |
| WO | WO-2015018057 A1 * | 2/2015 | ............... H04B 7/00 |
| WO | WO 2016/168128 A1 | 10/2016 | |

OTHER PUBLICATIONS

Kun, Zhao, "Analysis of Downlink MU-MIMO Physical Layer Techniques for LTE," pp. 5-8, English language Abstract.

Ahang, Shuai, et al., "Digital and analog hybrid precoding technology combined with V-BLAST in multi-user massive MIMO system," School of Telecommuication and Information Engineering, Xi'an University of Posts & Telecommunications, Xi'an 710121, China, Jul. 29, 2016, pp. 1-6.

Hsu, Kai-Neng, "Low complexity hybrid beamforming and precoding for 2D planar antenna array mmWave systems," 2015 IEEE Workshop on Signal Processing Systems (SiPS), see https://ieeexplore.ieee.org/document/7345029.

Chiu, Lin-Kai, et al., "Hybrid radio frequency beamforming and baseband precoding for downlink MU-MIMO mmWave channels," Department of Electrical and Computer Engineering, National Chiao Tung University, Hsinchu, Taiwan, 6 pages.

Sohrabi, Foad, "Hybrid Digital and Analog Beamforming Design for Large-Scale Antenna Arrays," IEEE Journal of Selected Topics in Signal Processing, 2016, pp. 1-13.

* cited by examiner

BEAMFORMING METHOD AND APPARATUS FOR MASSIVE MIMO SYSTEM

FIELD

The present disclosure generally relates to the field of communication technologies, and more particularly to a beamforming technical for a massive MIMO system.

BACKGROUND

At present, an RF (radio frequency) beamforming is applied to a solution of deploying a massive MIMO (Multiple Input Multiple Output) in an above-6 GHz mmWAVE (millimeter wave) frequency band. However, a solution of large-scale MIMO in sub-6 GHz needs to consider channel characteristics, FH (Fronthaul) capacity, an antenna structure, and a beamforming algorithm.

In the mmWAVE, RF beamforming adopts a LEN antenna or phase array antenna to form beam for different users. However, in a sub-6 GHz frequency band, since the channel has a large-angle scaling, the RF beamforming needs more antennas than in the mmWave so as to distinguish users. In a low frequency band, multi-antennas will cause a relatively large scale of antennas. Meanwhile, when the channel has a large-angle scale, the RF beamforming cannot well inhibit inter-user interference. Therefore, a baseband beamforming with an enhanced signal processing algorithm has to be used.

In 4G the number of antennas is 8, the bandwidth is 20 MHz, and the baseband beamforming is selected. However, in 5G (fifth generation mobile communication), there will be more than 64 antennas that all have a 100 MHz bandwidth; the FH cannot support so high a data rate. If the L1-layer processing is directly shifted to the RF, the FH transmission may be avoided; however, the complexity of the RF module cannot be accepted.

SUMMARY

An object of present disclosure is to provide a beamforming method and an apparatus for a massive MIMO system.

According to an aspect of the present disclosure, there is provided a beamforming method for a large-scale MIMO system, wherein antennas in the massive MIMO system is a M-row N-column antenna array, and each array element in each antenna pair in the antenna array is cross-polarized, wherein the method comprises steps of:

a. performing horizontal direction baseband beamforming processing to S routes of data streams to be transmitted via the antenna array, to obtain T routes of data streams;

b. performing vertical direction digital beamforming processing to said T routes of data streams, so as to map the T routes of data streams onto corresponding channels according to a predetermined rule, wherein the predetermined rule comprises:

said T routes of data streams and the channels to which they are mapped meet the following condition:

$AP(n) \times W\_DBF0 + AP(n+6) \times W\_DBF1 = Tx(4n, 4n+1, 4n+2, 4n+3)$, $n=0 \ldots S-1$, wherein, $AP(n)$ and $AP(n+16)$ denotes the nth-route data stream and the n+16th-route data stream in said T routes of data streams respectively; and, $W\_DBF0$ and $W\_DBF1$ denote corresponding digital beamforming weight coefficients of said $AP(n)$ and $AP(n+16)$ respectively, and $Tx(4n, 4n+1, 4n+2, 4n+3)$ denotes the channels to which they are mapped;

c. performing analog beamforming processing to a data stream on each channel so as to map the data stream on each channel to a corresponding array element of said antenna array for transmission.

According to an aspect of the present disclosure, there is provided a beamforming apparatus for a massive MIMO system, wherein antennas in the massive MIMO system is a M-row N-column antenna array, and each array element in each antenna pair in the antenna array is cross-polarized, wherein said apparatus comprises:

a baseband beamforming device, configured to perform horizontal direction baseband beamforming processing to S routes of data streams to be transmitted via the antenna array, to obtain T routes of data streams;

a digital beamforming device, configured to perform vertical direction digital beamforming processing to said T routes of data streams, so as to map the T routes of data streams onto corresponding channels according to a predetermined rule, wherein the predetermined rule comprises:

said T routes of data streams and the channels to which they are mapped meet the following condition:

$AP(n) \times W\_DBF0 + AP(n+6) \times W\_DBF1 = Tx(4n, 4n+1, 4n+2, 4n+3)$, $n=0 \ldots S-1$, wherein, $AP(n)$ and $AP(n+16)$ denotes the nth-route data stream and the n+16th-route data stream in said T routes of data streams respectively; and, $W\_DBF0$ and $W\_DBF1$ denote corresponding digital beamforming weight coefficients of said $AP(n)$ and $AP(n+16)$ respectively, and $Tx(4n, 4n+1, 4n+2, 4n+3)$ denotes the channels to which they are mapped;

an analog beamforming device, configured to perform analog beamforming processing to a data stream on each channel so as to map the data stream on each channel to a corresponding array element of said antenna array for transmission.

According to an aspect of the present disclosure, there is provided a Base Station, wherein, said Base Station comprises said apparatus of beamforming for a massive MIMO system.

Compared with the prior art, by performing baseband beamforming processing in the horizontal direction while performing digital beamforming processing in the vertical direction, the present disclosure implements the following advantageous effects: by combining the advantages of RF beamforming with the BB (Baseband) beamforming with limited antennas at the FH, a good flexibility regarding BB algorithm selection and RF beam design is provided, which balances the complexity and performance between BB and RF, and implements a massive MIMO in sub-6 GHz; moreover, in the present disclosure, the RF beam design adopts an uplink sounding reference signal, which differs from 5G version. In the 5G version, the base station needs to transmit a beam reference signal, and the UE needs to estimate the beam reference signal and feeds back a beam ID to the base station. With the uplink sounding reference signal, the present disclosure may reduce the complexity of the antenna model and well estimate the interference between RF beams.

BRIEF DESCRIPTION OF THE DRAWINGS

Other features, objects, and advantages of the present disclosure will become more apparent through reading the detailed description of the non-limiting embodiments with reference to the accompanying drawings.

Same or similar reference numerals in the drawings represent same or similar components.

DETAILED DESCRIPTION OF EMBODIMENTS

Figure 1:
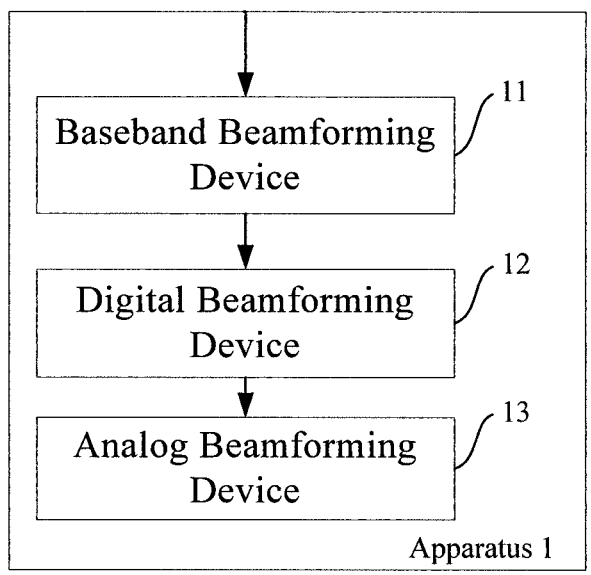
FIG. 1 shows a schematic diagram of a beamforming apparatus for a massive MIMO system.

FIG. 1 shows a beamforming apparatus 1 for a massive MIMO system, wherein antennas in the massive MIMO system is a M-row N-column antenna array, and each array element in each antenna pair in the antenna array is cross-polarized, wherein the apparatus 1 comprises a baseband beamforming device 11, a digital beamforming device 12, and an analog beamforming device 13. Specifically, the baseband beamforming device 11 performs horizontal direction baseband beamforming processing to s-routes data streams to be transmitted through the antenna array, to obtain a T-routes data steams; the digital beamforming apparatus 12 performs vertical direction digital beamforming processing to the T-routes of data streams to map the T-routes data steam onto corresponding channels according to a preset rule, wherein the preset rule comprises: the T-routes of data streams and the channels to which they are mapped meet the following condition: AP(n)×W_DBF0+AP(n+16)×W_DBF1=Tx(4n,4n+1,4n+2,4n+3), n=0 . . . S−1, where AP(n) denotes the nth-route data stream in the T routes of data streams; and W_DBF0 and W_DBF1 denote corresponding digital beamforming weight coefficients, and Tx(4n,4n+1,4n+2,4n+3) denote the channels to which they are mapped; the analog beamforming device 13 performs analog beamforming processing to the data stream on each channel, so as to map the data stream on each channel to a corresponding array element of the antenna array for transmission.

Here, the apparatus 1 includes, but not limited to, any kind of electronic product for beamforming, e.g., a space-time/space-frequency diversity transmitter, a base station, and etc. The base station herein refers to a device (e.g., eNB base station), in a mobile communication system, that connects fixed parts and wireless parts and is connected with a mobile station. Those skilled in the art should understand that the apparatus 1 and the base station are only examples, and other exiting or future possibly evolving device 1 or base station, if applicable to the present disclosure, should also be included within the protection scope of the present disclosure, which are incorporated here by reference.

Specifically, the baseband beamforming device 11 performs a horizontal direction baseband beamforming processing to S routes of data streams to be transmitted through the antenna array, to obtain T routes of data streams.

Figure 2:
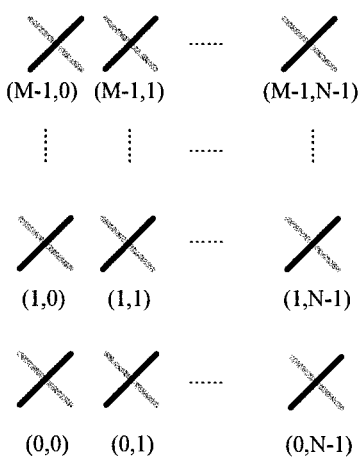
FIG. 2 shows a schematic diagram of a 8×8 antenna array model used in the prior art.

Here, the S routes of data streams refer to the number of data streams required by the massive MIMO system, e.g., the current CMCC (China Mobile Communications Corporation) employs 128 antennas and 64 transceivers (TRX) in the massive MIMO system, requiring 16 data streams to meet a peak throughput requirement; it employs a 8×8 antenna array model, wherein each array element in each antenna pair is cross-polarized, as shown in FIG. 2 (in FIG. 2, M=8, N=8).

In a preferred embodiment, the T routes of data streams may be transmitted to a transmission interface connected with an output end of the baseband beamforming device 11, as input signals for the transmission interface.

Hereinafter, the horizontal direction baseband beamforming will be illustrated with an antenna array model shown in FIG. 2:

Specifically, the baseband beamforming device 11 precodes the 16 routes of data streams using a baseband L1-layer MU-MIMO, so as to perform the horizontal direction baseband beamforming processing to the 16 routes of data streams, e.g., to obtain 32 routes of data streams. Preferably, a pre-coding weight of the baseband L1-layer MU-MIMO may be obtained through UL SRS (Uplink Sounding Reference Signal) according to a ZF (Zero Forcing) algorithm. As shown in FIG. 13, 16 routes of data streams are represented as Layer0-15; the MU-MIMO module performs the horizontal direction baseband beamforming processing to the 16 routes of data streams, and obtain 32 routes of data streams, which are inputted into the transmission interface (CPRI/FH); if the Layer0~Layer7 data streams are subjected to the horizontal direction baseband beamforming processing by the MU-MIMO module, obtaining AP0~AP15 data streams; the Layer8~Layer15 data streams are subjected to the horizontal direction baseband beamforming processing by the MU-MIMO module, obtaining AP16~AP31 data streams, as input signals for the transmission interface (CPRI/FH).

Then, the digital beamforming device 12 performs vertical direction digital beamforming processing to the T routes of data streams, so as to map the T routes of data streams to the corresponding channels according to a preset rule, wherein the preset rule includes that: the T routes of data streams and the channels to which they are mapped meet the following condition: AP(n)×W_DBF0+AP(n+16)×W_DBF1=Tx(4n,4n+1,4n+2,4n+3), n=0 . . . S−1, where AP(n) denotes the nth-route data stream in the T routes of data streams; and, W_DBF0 and W_DBF1 denote corresponding digital beamforming weight coefficients, and Tx(4n,4n+1,4n+2,4n+3) denote the channels to which they are mapped.

Figure 3:
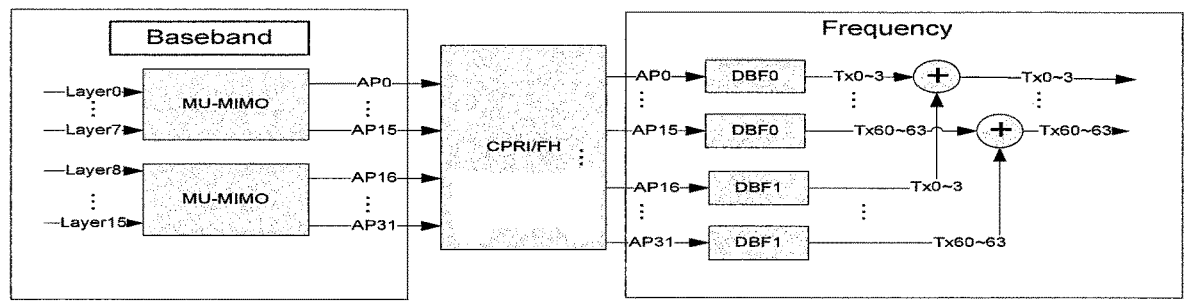
FIG. 3 shows a schematic diagram according to a preferred embodiment of the present disclosure, in which a data stream to be transmitted through an antenna array is successively subjected to horizontal direction baseband beamforming processing and vertical direction digital beamforming processing, and then is mapped to a corresponding channel.

For example, continuing the example above, as shown in FIG. 3, each AP data, after being processed by the DBF (digital beamforming) module, turns into 4 routes of TX data, thereby implementing signal weight retuning and meeting: AP(n)×W_DBF0+AP(n+16)×W_DBF1=Tx(4n, 4n+1,4n+2,4n+3), n=0 . . . 15; for example, the AP0 data, after being processed by DBF0, are mapped to the channel TX0~3; and so on; However, the AP16 data are also mapped to the channel TX0~3 after being processed by DBF1, thereby reducing the quantity of channels; the DBF0 module performs vertical direction digital beamforming processing to the AP data inputted therein with the digital beam weighting coefficient W_DBF0; the DBF1 module performs vertical direction digital forming processing to the AP data inputted therein with the digital beam weighting coefficient W_DBF1. Here, the digital beam weighting coefficients W_DBF0 and W_DBF1 represent the beam IDs stored on the DBF0 and DBF1 as candidate beams, e.g., W_DBF0 represents beam ID 0, and W_DBF1 represents beam ID 1. Here, the number of DBF dimensions is equal to the determined quantity of vertical direction antenna ports of the antenna array, e.g., now, there are 128 array element antennas, 64 antenna ports, wherein there are 16 horizontal directions and 4 vertical directions; therefore, the number of DBF dimensions is 4.

Figure 4:
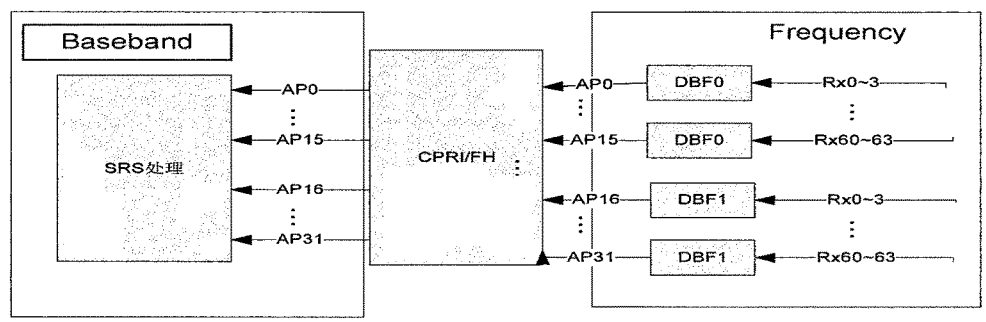
FIG. 4 shows a schematic diagram of knowing an optimum beam ID by applying a UL SRS according to a preferred embodiment of the present disclosure.

Here, according to the present disclosure, through the UL SRS processing, each AP may know the optimum beam ID selected by the UE; and the UE may utilize SRS (Sounding Reference Signal) to estimate the following signals: 1) the UE's own signal energy; 2) for different digital beam weights, the interferences from other UEs. The specific process of applying the UL SRS processing to know the optimum beam ID is shown in FIG. 4. The UE may use the reciprocity between uplink and downlink channels, such that upon uplink reception, the received signal is weighted using a different RF beam (DBF0/DBF1); the UL SRS signal is estimated under different weight signals. In this way, the UE's receive signal energies under different RF beams may be obtained. The UE may estimate its own transmit beam direction (DBF0/DBF1) according to the receive signal energy and estimate the interference caused by the other beam direction to itself. AP0~AP15 only need to carry the data of the UE on the beam ID 0; AP16~AP31 only need to carry the data of the UE on beam ID1; after DBF processing, the data of beam ID 0 and the data of beam ID 1 are superimposed.

In a preferred embodiment, those skilled in the art should understand that the beamforming device 12 may be located in a radio frequency module of the existing base station.

Preferably, the apparatus 1 further comprises a transmitting device (not shown). Specifically, the transmitting device transmits the N routes of data streams via a transmission interface, wherein the number of dimensions of the transmission interface is equal to twice the determined quantity of horizontal direction antenna ports of the antenna array; the digital beamforming device 12 performs vertical direction digital beamforming processing to the N routes of data streams outputted via the transmission interface so as to map the T routes of data streams to the corresponding channel according to a preset rule.

Here, the number of dimensions of the transmission interface refers to the number of input ports of the transmission interface. For example, now there are 128 array element antennas and 64 antenna ports, wherein there are 16 horizontal directions and 4 vertical directions; therefore, the number of CPRI/FH interfaces is 16*2=32.

Next, the analog beamforming device 13 performs analog beamforming processing to the data streams on each channel, so as to map the data streams on each channel to the corresponding array elements of the antenna array for transmission.

Figure 5:
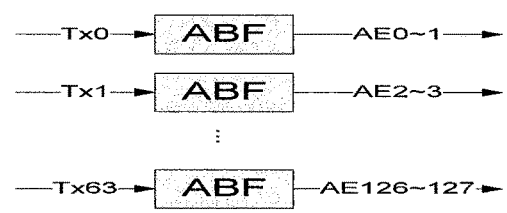
FIG. 5 shows a schematic diagram of a relationship between a data stream on a channel and an array element to which it is mapped according to a preferred embodiment of the present disclosure.

For example, still continuing the example above, each Tx data, after being processed by analog beamforming, is mapped to 2 array elements of the antenna array, as shown in FIG. 5 (wherein ABF denotes the analog beamforming, and AE denotes an array element); for example, the data stream on the channel Tx0, after being processed by the ABF module, is mapped on the array element AE0~1; the data stream on Tx1, after being processed by the ABF module, is mapped to array elements AE2~3; and so on; the data stream on Tx63, after being processed by the ABF module, is mapped to the array elements AE126~127.

Here, after being processed by the ABF module, the present disclosure designs the beam ID 0 and beam ID 1 to be substantially orthogonal and fully cover the spatial area; the UE on the beam ID 0 will not be interfered by the beam ID1; due to the baseband MU-MIMO method, the UE on the same beam ID may implement spatial multiplexing.

Figure 6:
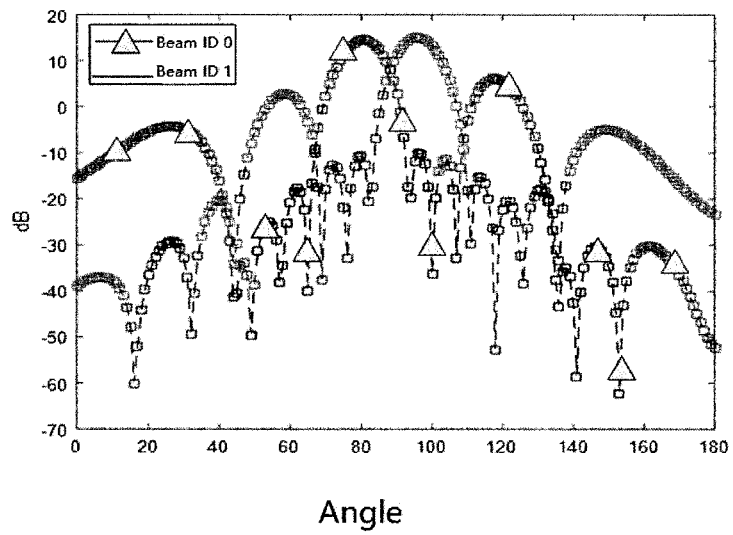
FIG. 6 shows a schematic diagram of weights of beam ID 0 and beam ID 1, which are both vertical beams, in different directions according to a preferred embodiment of the present disclosure.

FIG. 6 shows a schematic diagram of weights of beam ID 0 and beam ID 1, which are both vertical beams, in different directions.

Figure 7:
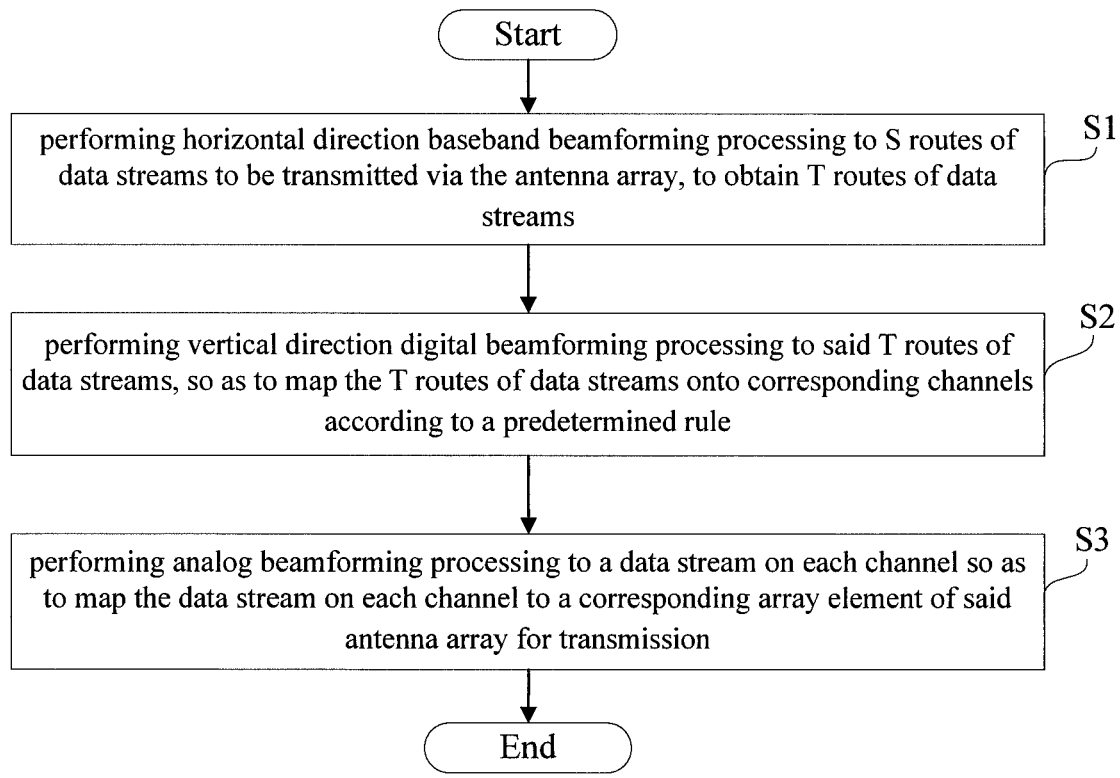
FIG. 7 shows a schematic diagram of a flow of a beamforming method for a large-scale MIMO system according to another aspect of the present disclosure.

FIG. 7 shows a schematic diagram of a flow of a beamforming method for a massive MIMO system according to another aspect of the present disclosure.

Wherein antennas in the massive MIMO system is a M-row N-column antenna array, and each array element in each antenna pair in the antenna array is cross-polarized. Wherein, the method according to the present disclosure comprises step S1, step S2 and step S3. Specifically, in step S1, the apparatus 1 performs horizontal direction baseband beamforming processing to s-routes data streams to be transmitted through the antenna array, to obtain a T-routes data steams; in step S2, the apparatus 1 performs vertical direction digital beamforming processing to the T-routes of data streams to map the T-routes data steam onto corresponding channels according to a preset rule, wherein the preset rule comprises: the T-routes of data streams and the channels to which they are mapped meet the following condition: $AP(n) \times W\_DBF0 + AP(n+16) \times W\_DBF1 = Tx(4n, 4n+1, 4n+2, 4n+3)$, $n=0 \ldots S-1$, where $AP(n)$ denotes the nth-route data stream in the T routes of data streams; and W_DBF0 and W_DBF1 denote corresponding digital beamforming weight coefficients, and $Tx(4n, 4n+1, 4n+2, 4n+3)$ denote the channels to which they are mapped; in step S3, the apparatus 1 performs analog beamforming processing to the data stream on each channel, so as to map the data stream on each channel to a corresponding array element of the antenna array for transmission.

Here, the apparatus 1 includes, but not limited to, any kind of electronic product for beamforming, e.g., a space-time/space-frequency diversity transmitter, a base station, and etc. The base station herein refers to a device (e.g., eNB base station), in a mobile communication system, that connects fixed parts and wireless parts and is connected with a mobile station. Those skilled in the art should understand that the apparatus 1 and the base station are only examples, and other exiting or future possibly evolving device 1 or base station, if applicable to the present disclosure, should also be included within the protection scope of the present disclosure, which are incorporated here by reference.

Specifically, in step S1, the apparatus 1 performs a horizontal direction baseband beamforming processing to S routes of data streams to be transmitted through the antenna array, to obtain T routes of data streams.

Here, the S routes of data streams refer to the number of data streams required by the massive MIMO system, e.g., the current CMCC (China Mobile Communications Corporation) employs 128 antennas and 64 transceivers (TRX) in the massive MIMO system, requiring 16 data streams to meet a peak throughput requirement; it employs a 8×8 antenna array model, wherein each array element in each antenna pair is cross-polarized, as shown in FIG. 2 (in FIG. 2, M=8, N=8).

In a preferred embodiment, the T routes of data streams may be transmitted in step S1, to a transmission interface connected with an output end of the apparatus 1, as input signals for the transmission interface.

Hereinafter, the horizontal direction baseband beamforming will be illustrated with an antenna array model shown in FIG. 2:

Specifically, in step S1, the apparatus 1 pre-codes the 16 routes of data streams using a baseband L1-layer MU-MIMO, so as to perform the horizontal direction baseband beamforming processing to the 16 routes of data streams, e.g., to obtain 32 routes of data streams. Preferably, a pre-coding weight of the baseband L1-layer MU-MIMO may be obtained through UL SRS (Uplink Sounding Reference Signal) according to a ZF (Zero Forcing) algorithm. As shown in FIG. 13, 16 routes of data streams are represented as Layer0-15; the MU-MIMO module performs the horizontal direction baseband beamforming processing to the 16 routes of data streams, and obtain 32 routes of data streams, which are inputted into the transmission interface (CPRI/FH); if the Layer0~Layer7 data streams are subjected to the horizontal direction baseband beamforming processing by the MU-MIMO module, obtaining AP0~AP15 data streams; the Layer8~Layer15 data streams are subjected to the horizontal direction baseband beamforming processing by the MU-MIMO module, obtaining AP16~AP31 data streams, as input signals for the transmission interface (CPRI/FH).

Then, in step S2, the apparatus 1 performs vertical direction digital beamforming processing to the T routes of data streams, so as to map the T routes of data streams to the corresponding channels according to a preset rule, wherein the preset rule includes that: the T routes of data streams and the channels to which they are mapped meet the following condition: $AP(n) \times W\_DBF0 + AP(n+16) \times W\_DBF1 = Tx(4n, 4n+1, 4n+2, 4n+3)$, $n=0 \ldots S-1$, where $AP(n)$ denotes the nth-route data stream in the T routes of data streams; and, $W\_DBF0$ and $W\_DBF1$ denote corresponding digital beamforming weight coefficients, and $Tx(4n, 4n+1, 4n+2, 4n+3)$ denote the channels to which they are mapped.

For example, continuing the example above, as shown in FIG. 3, each AP data, after being processed by the DBF (digital beamforming) module, turns into 4 routes of TX data, thereby implementing signal weight retuning and meeting: $AP(n) \times W\_DBF0 + AP(n+16) \times W\_DBF1 = Tx(4n, 4n+1, 4n+2, 4n+3)$, $n=0 \ldots 15$; for example, the AP0 data, after being processed by DBF0, are mapped to the channel TX0~3; and so on; However, the AP16 data are also mapped to the channel TX0~3 after being processed by DBF1, thereby reducing the quantity of channels; the DBF0 module performs vertical direction digital beamforming processing to the AP data inputted therein with the digital beam weighting coefficient W_DBF0; the DBF1 module performs vertical direction digital forming processing to the AP data inputted therein with the digital beam weighting coefficient W_DBF1. Here, the digital beam weighting coefficients W_DBF0 and W_DBF1 represent the beam IDs stored on the DBF0 and DBF1 as candidate beams, e.g., W_DBF0 represents beam ID 0, and W_DBF1 represents beam ID 1. Here, the number of DBF dimensions is equal to the determined quantity of vertical direction antenna ports of the antenna array, e.g., now, there are 128 array element antennas, 64 antenna ports, wherein there are 16 horizontal directions and 4 vertical directions; therefore, the number of DBF dimensions is 4.

Here, according to the present disclosure, through the UL SRS processing, each AP may know the optimum beam ID selected by the UE; and the UE may utilize SRS (Sounding Reference Signal) to estimate the following signals: 1) the UE's own signal energy; 2) for different digital beam weights, the interferences from other UEs. The specific process of applying the UL SRS processing to know the optimum beam ID is shown in FIG. 4. The UE may use the reciprocity between uplink and downlink channels, such that upon uplink reception, the received signal is weighted using a different RF beam (DBF0/DBF1); the UL SRS signal is estimated under different weight signals. In this way, the UE's receive signal energies under different RF beams may be obtained. The UE may estimate its own transmit beam direction (DBF0/DBF1) according to the receive signal energy and estimate the interference caused by the other beam direction to itself. AP0~AP15 only need to carry the data of the UE on the beam ID 0; AP16~AP31 only need to carry the data of the UE on beam ID1; after DBF processing, the data of beam ID 0 and the data of beam ID 1 are superimposed.

In a preferred embodiment, those skilled in the art should understand that the beamforming device 12 may be located in a radio frequency module of the existing base station.

Preferably, the method further comprises step S4 (not shown). Specifically, in step S4, the apparatus 1 transmits the N routes of data streams via a transmission interface, wherein the number of dimensions of the transmission interface is equal to twice the determined quantity of horizontal direction antenna ports of the antenna array; the digital beamforming device 12 performs vertical direction digital beamforming processing to the N routes of data streams outputted via the transmission interface so as to map the T routes of data streams to the corresponding channel according to a preset rule.

Here, the number of dimensions of the transmission interface refers to the number of input ports of the transmission interface. For example, now there are 128 array element antennas and 64 antenna ports, wherein there are 16 horizontal directions and 4 vertical directions; therefore, the number of CPRI/FH interfaces is 16*2=32.

Next, in step S3, the apparatus 1 performs analog beamforming processing to the data streams on each channel, so as to map the data streams on each channel to the corresponding array elements of the antenna array for transmission.

For example, still continuing the example above, each Tx data, after being processed by analog beamforming, is mapped to 2 array elements of the antenna array, as shown in FIG. 5 (wherein ABF denotes the analog beamforming, and AE denotes an array element); for example, the data stream on the channel Tx0, after being processed by the ABF module, is mapped on the array element AE0~1; the data stream on Tx1, after being processed by the ABF module, is mapped to array elements AE2~3; and so on; the data stream on Tx63, after being processed by the ABF module, is mapped to the array elements AE126~127.

Here, after being processed by the ABF module, the present disclosure designs the beam ID 0 and beam ID 1 to be substantially orthogonal and fully cover the spatial area; the UE on the beam ID 0 will not be interfered by the beam ID1; due to the baseband MU-MIMO method, the UE on the same beam ID may implement spatial multiplexing.

It should be noted that present disclosure could be implemented through the combination of hardware and software, such as, through ASIC (Application Specific Integrated Circuit), general purpose computer or any other hardware device alike. In one embodiment, the software program of the present disclosure may be executed through a processor to implement the steps or functions as mentioned above. The software program (including relevant data structure) of the present disclosure may be stored in a computer readable recording medium, e.g., RAM memory, magnetic or optic driver or soft floppy or similar devices. Additionally, some steps or functions of the present disclosure may be implemented by hardware, for example, a circuit cooperating with the processor so as to implement various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

We claim:

1. A beamforming method for a massive MIMO system, wherein antennas in the massive MIMO system is a M-row N-column antenna array, and at least one array element in at least one antenna pair in the antenna array is cross-polarized, wherein the method comprises:
performing horizontal direction baseband beamforming processing to S routes of data streams to be transmitted via the antenna array, to obtain T routes of data streams, wherein the T routes of data streams correspond to the number of CPRI/FH interfaces;
performing vertical direction digital beamforming processing to said T routes of data streams, so as to map the T routes of data streams onto corresponding channels according to a predetermined rule, wherein the preset rule comprises:
said T routes of data streams and the channels to which they are mapped meet the following condition:
AP(n) W_DBF0+AP(n+16) W_DBF1=Tx(4n,4n+1,4n+2, 4n+3), n=0 . . . S−1, wherein, AP(n) and AP(n+16) denotes the nth-route data stream and the n+16th-route data stream in said T routes of data streams respectively; and, W_DBF0 and W_DBF1 denote corresponding digital beamforming weight coefficients of said AP(n) and AP(n+16) respectively, and Tx(4n,4n+ 1,4n+2,4n+3) denotes the channels to which they are mapped, wherein S is 16, T is 32;
performing analog beamforming processing to a data stream on at least one channel so as to map the data stream on the at least one channel to a corresponding array element of said antenna array for transmission.

2. The method according to claim 1, wherein said performing horizontal direction baseband beamforming processing to S routes of data streams to be transmitted via the antenna array, to obtain T routes of data streams comprises:
performing pre-coding to said S routes of data streams using baseband L1-layer MU-MIMO, so as to perform the horizontal direction baseband beamforming processing to the S routes of data streams, to obtain T routes of data streams.

3. The method according to claim 1, wherein if M=N=8, said performing analog beamforming processing to a data stream on at least one channel so as to map the data stream on the at least one channel to a corresponding array element of said antenna array for transmission comprises:
performing analog beamforming processing to the data stream on the at least one channel so as to map the data stream on the at least one channel to corresponding two array elements of the antenna array for transmission.

4. The method according to claim 1, wherein said method further comprises:
transmitting said N routes of data streams via a transmission interface, wherein the number of dimensions of said transmission interface is equal to twice the determined quantity of horizontal direction antenna ports of said antenna array.

5. A beamforming apparatus for a massive MIMO system, wherein antennas in the massive MIMO system is a M-row N-column antenna array, and at least one array element in at least one antenna pair in the antenna array is cross-polarized, wherein said apparatus comprises:
a baseband beamforming device, configured to perform horizontal direction baseband beamforming processing to S routes of data streams to be transmitted via the antenna array, to obtain T routes of data streams, wherein the T routes of data streams correspond to the number of CPRI/FH interfaces;
a digital beamforming device, configured to perform vertical direction digital beamforming processing to said T routes of data streams, so as to map the T routes of data streams onto corresponding channels according to a preset rule, wherein the predetermined rule comprises:
said T routes of data streams and the channels to which they are mapped meet the following condition:
AP(n) W_DBF0+AP(n+16) W_DBF1=Tx(4n,4n+1,4n+2, 4n+3), n=0 . . . S−1, wherein, AP(n) and AP(n+16) denotes the nth-route data stream and the n+16th-route data stream in said T routes of data streams respectively; and, W_DBF0 and W_DBF1 denote corresponding digital beamforming weight coefficients of said AP(n) and AP(n+16) respectively, and Tx(4n,4n+ 1,4n+2,4n+3) denotes the channels to which they are mapped, wherein S is 16, T is 32;
an analog beamforming device, configured to perform analog beamforming processing to a data stream on at least one channel so as to map the data stream on the at least one channel to a corresponding array element of said antenna array for transmission.

6. The apparatus according to claim 5, wherein said baseband beamforming device is further configured to:

perform pre-coding to said S routes of data streams using baseband L1-layer MU-MIMO, so as to perform the horizontal direction baseband beamforming processing to the S routes of data streams, to obtain T routes of data streams.

7. The apparatus according to claim 5, wherein if M=N=8, said analog beamforming device is further configured to:
perform analog beamforming processing to the data stream on the at least one channel so as to map the data stream on the at least one channel to corresponding two array elements of the antenna array for transmission.

8. The apparatus according to claim 5, wherein said apparatus is further configured to:
transmit said N routes of data streams via a transmission interface, wherein the number of dimensions of said transmission interface is equal to twice the determined quantity of horizontal direction antenna ports of said antenna array.

9. A Base Station, wherein, said Base Station comprises said apparatus in accordance with claim 5.

* * * * *